United States Patent [19]
Groeber

[11] Patent Number: 5,807,113
[45] Date of Patent: Sep. 15, 1998

[54] METHOD AND APPARATUS FOR TRAINING IN THE DETECTION OF NUCLEAR, BIOLOGICAL AND CHEMICAL (NBC) CONTAMINATION

[75] Inventor: Edward O. Groeber, Jackson, N.J.

[73] Assignee: The United States of America as represented by the Secretary of the Army, Washington, D.C.

[21] Appl. No.: 641,136

[22] Filed: Apr. 22, 1996

[51] Int. Cl.⁶ .................................................. G09B 9/00
[52] U.S. Cl. ............................................................. 434/218
[58] Field of Search ............................. 434/218; 364/400, 364/578

[56] References Cited

U.S. PATENT DOCUMENTS

| | | | |
|---|---|---|---|
| 4,500,295 | 2/1985 | Insinger et al. | |
| 4,582,491 | 4/1986 | Monteith. | |
| 5,423,683 | 6/1995 | Hurst et al. | 434/218 |
| 5,470,233 | 11/1995 | Fruchterman et al. | 434/112 |
| 5,518,402 | 5/1996 | Tommarello et al. | 434/226 |

OTHER PUBLICATIONS

(Abstract), "A computer system for simulating the transfer of pollutants over complex terrain–some recent applications", Catsaros et al., Radiat. Prot. Dosimet., vol. 50, No. 2–4, pp. 257–263, 1993.

*Primary Examiner*—Robert A. Hafer
*Assistant Examiner*—John Edmund Rovnak
*Attorney, Agent, or Firm*—Michael Zelenka; John M. O'Meara

[57] ABSTRACT

A method and apparatus for training a user in the detection of nuclear, biological, and chemical contamination. Specifically, a fallout pattern generating algorithm is used to algebraically define an elliptical fallout pattern of contamination based on input provided by the user for ground zero location, wind characteristics, and fallout pattern characteristics as well as positional data for the user's location derived from a global positioning system or comparable system. A contamination value, which is indicative of a contamination level for the user's location at an elapsed time, is then calculated and displayed. This method and apparatus can be used to effectively simulate prompt radiation, arriving fallout or chemical/biological plumes, and hotspots of contamination. The apparatus can be implemented in several highly portable configurations that can be carried by a user into a training location to realistically approximate the appearance and operation of actual detection devices.

14 Claims, 4 Drawing Sheets

Legend:
$DR_1 = 1/L_1^2$
$DR_2 = 1/L_2^2$
$DR_3 = 1/L_3^2$

METHOD AND APPARATUS FOR TRAINING IN THE DETECTION OF NUCLEAR, BIOLOGICAL AND CHEMICAL (NBC) CONTAMINATION

GOVERNMENT INTEREST

The invention described herein may be manufactured, used, imported, sold, and licensed by or for the government of the United States of America without the payment to me of any royalty thereon.

FIELD OF THE INVENTION

This invention relates to the field of nuclear, biological, and chemical detection, and more particularly to a method and apparatus for training in nuclear, biological, and chemical detection which, by simulating the fallout of contamination through the use of a computer-based system programmed with a fallout pattern generating algorithm, provides realistic training without exposing individuals to safety and health risks, and the like.

BACKGROUND OF THE INVENTION

The Armed Forces have a requirement and a need to train service members in the use of nuclear, biological and chemical (hereinafter referred to as NBC) detection devices to help them survive on the modern battlefield in the event NBC weapons are employed during a war. Peacetime training requirements also exist in that personnel must be trained to operate in hazardous environments that pose health and safety risks, such as in the monitoring of maintenance areas where equipment containing radioactive materials are repaired and for response to nuclear weapons accidents. Most recently, detection devices have been used to safely recover damaged armored vehicles that contain depleted Uranium in the ammunition or the armor plate. Similar training requirements also exist for non-military applications, such as training for nuclear reactor accidents, accidental hazardous chemical discharges, and the like. In all military and civilian applications, realistic training is difficult to achieve since actual NBC agents cannot be used in the training environment without imposing significant health, safety, and environmental risks.

Over the years, radio-frequency (RF) training devices have been the predominant alternative for training in the use of NBC detectors. For example, training with simulated nuclear radiation detection devices, such as radiac devices, has been accomplished by using a radio-frequency transmitter and a simulated dose rate meter that functions similar to a radiac, but is in fact a radio-frequency signal strength meter. The receiver registers higher readings when either the transmitter power is increased or the operator moves closer to the antenna. Consequently, in such a system, the readings are inversely proportional to the distance from the transmitter. The resulting fallout pattern can typically be changed in shape only by changing the antenna design of the RF system.

These systems are intended to simulate operation in a typical nuclear fallout field, however, there are numerous drawbacks which inhibit realistic training. Namely, with an RF-based system, it is difficult to obtain reproducible results because of inconsistent and inaccurate readings that typically are caused by multi-path reflections from terrain, structures, power lines, fences, vehicles, people, and the like. These problems of lack of reproducibility and inconsistent and inaccurate readings due to undesirable reflections of the RF signal therefore diminish the training benefits that are otherwise achieved by using such a system.

The transmitters and antennas used in an RF system also can require time-consuming installation as well as the use of large power sources such as vehicle batteries or AC power for operation. Receiver antenna orientation and position with respect to the individual carrying the device must also be constant in order to obtain consistent readings. Moreover, altering the fallout pattern or modifying fallout scenarios, which is necessary to simulate realistic conditions, requires changes to transmitter output power, receiver sensitivity, or the antenna configuration, each of which are limited by design considerations. Consequently, these constraints of existing RF-based systems impose unrealistic training burdens and negate the training value that could otherwise be achieved. Although a modern RF system could be developed using standard military or commercial components, most of the operational and technical drawbacks would still not be overcome.

Devices employing magnets have also been used for simulating contamination for the purpose of providing training in the use of NBC detectors. However, these devices have been limited solely to applications involving NBC detection on individual personnel and equipment because of the inherent limitations with magnetic materials. Specifically, for these devices to operate effectively, the contamination source and detection means must be located within very close proximity to each other in order for the magnetic functions to become activated. Consequently, these types of devices are not intended for and are not well-suited for training in the detection of NBC contaminants on an area-wide basis in a geographical region.

Those skilled in the art have also suggested a computer-based solution for representing fallout patterns using stored data that has been preprogrammed to define points of contamination concentration for specified map coordinates within an exercise area. For example, a portable device having a computer program has been used to derive a fallout plan for NBC contamination. In such a device, an algorithm is employed that interpolates preprogrammed data, which must be previously derived from a mathematical model, to define contamination levels at various locations within an exercise area. Because the algorithm calculates fallout based on stored data, this device is limited by the amount of available computer memory, especially since large amounts of data must be held by the device for a given training area that spans hundreds of square miles. Moreover, because the contamination data for the exercise location must be preprogrammed into the device, coupled with the requirement that a user must manually enter position data for each location in which a contamination reading is sought, the device does not readily support highly mobile training requirements nor accommodate real-time changes in tactical scenarios which are typical of realistic NBC operations. Consequently, the effectiveness of training with such a device is diminished as a result of the setup requirements and other planning burdens which ultimately detract from the quantity and quality of training time.

Therefore, while some advances have been made in the design of RF and other NBC training systems, these advances have not yet produced a device or system that provides realistic training while minimizing the technical and operational drawbacks that otherwise impede the effectiveness of the training.

SUMMARY OF THE INVENTION

Accordingly, it is an object of the present invention to provide a method for simulating the detection of NBC contamination by determining a fallout pattern and corresponding contamination levels using relevant environmental and operational data parameters required to provide training in a realistic operational environment.

It is also an object of the present invention to provide an apparatus, which can be carried by the user to exercise locations, for simulating the detection of NBC contamination using near real-time positional information in combination with other data parameters to produce realistic data in an expedient manner for a user in a mobile training environment.

These and other objects of the invention are achieved by determining a fallout pattern using positional data that is derived for the user's location in conjunction with data provided by the user for wind characteristics, time of burst, location of the burst (i.e., ground zero location), and fallout pattern characteristics. Typical nuclear fallout and biological and chemical clouds and contamination patterns are generally elliptical in shape because of prevailing wind conditions that drive the contamination downwind. For example, a nuclear fallout cloud is wind-driven in that radioactive "dust" falls out along the route of travel of the cloud based on the wind speed and direction. Because typical fallout patterns of NBC contamination are elliptical in nature, the fallout pattern is defined algebraically so that a contamination value can then be calculated and displayed that is indicative of a contamination level for the user's present location.

Illustratively, a method according to the principles of the invention includes automatically deriving positional data representing the coordinates of the user's location using a global positioning system or comparable system, inputting user-defined data parameters, algebraically defining an elliptical fallout pattern using the positional and user-defined data, calculating a contamination value for the elliptical fallout pattern, and displaying the contamination value to the user.

Use of a global positioning system (GPS) or other comparable system to automatically derive location coordinates for a user's location solves the problems experienced in the prior art RF-based systems. In particular, GPS systems are much less susceptible to transmission anomalies such as interference and path reflections which typically prevent RF-based systems from achieving reproducible results. Moreover, GPS systems are highly accurate in determining a user's location in a mobile environment and therefore provide positional data that can be used to produce realistic and meaningful contamination data as the user travels through a simulated contaminated area.

According to another aspect of the invention, a computer and computer program having a fallout pattern generating algorithm is used as the means for algebraically defining the fallout pattern. In contrast to the prior art RF-based devices, the present invention uses the highly accurate GPS position information as input to an algorithm executed within a computer program which manipulates the various data inputs to calculate a simulated contamination value. Therefore, stable reproducible results are obtained from the present invention, whereas one of the major drawbacks of the prior art RF-based devices has been the inability to achieve such results. Moreover, in the present invention, a multitude of different fallout scenarios having various pattern shapes and sizes can be selected by simply changing parameters in the software. Whereas, in the prior art RF-based devices, these types of changes are not readily implemented by a user due to constraints and limitations associated with changing transmitter or antenna characteristics.

The present invention also solves the problems of the art by utilizing a fallout pattern generating algorithm as opposed to large databases or lookup tables and thus computer memory requirements do not inhibit the effectiveness of the present invention.

Further, the present invention provides a method and apparatus for simulating detection of NBC contamination in near real-time by employing a position location system such as a global positioning system which automatically provides the positional data of a user traveling through an exercise area as input to an algorithm that computes the contamination values. Moreover, because the algorithm iteratively computes contamination values as each new location is determined by the global positioning system, the user need not be concerned with whether the location is within the geographical boundaries as defined by preprogrammed data. Consequently, the present invention is particularly well-suited for mobile training applications and provides more realistic training than the prior art devices.

In accordance with another aspect of the invention, the fallout pattern generating algorithm accounts for numerous operational and environmental variables such as time-factored decay, wind-driven fallout, backlobe fallout, hotspot fallout, and the like. As a result, the present invention can be used to effectively simulate prompt radiation, arriving fallout, moving chemical/biological plumes, hotspots for any given location within a fallout pattern, and numerous other scenarios that represent realistic operations in an NBC environment.

An apparatus according to the principles of the invention comprises a position deriving means, such as a global positioning system, a user input means, a means for algebraically defining a fallout pattern, such as a computer with a computer program having a fallout pattern generating algorithm that is responsive to positional data provided by the position deriving means and user defined data parameters provided by the user input means, and a display means that communicates with the fallout pattern defining means. In addition to the advantages previously described, the portability of the apparatus supports various configurations that closely approximate the appearance and operation of actual detection devices, and therefore accentuates the training benefits offered by the invention.

Thus, the illustrative embodiments of the invention shown and described herein largely overcome the shortcomings of the prior art by providing a method and apparatus for simulating the detection of NBC contamination which uses accurate positional data that is not susceptible to interference or other transmission anomalies caused by environmental and physical factors and an algorithm for producing stable reproducible results without relying on memory-consuming features such as preprogrammed data stores and lookup tables, all combined in a highly portable configuration that can be used in mobile environments to provide realistic and effective training.

BRIEF DESCRIPTION OF THE DRAWINGS

The features of the invention will be readily understood in light of the following Detailed Description of the Invention and the attached drawings, wherein.

DETAILED DESCRIPTION OF THE INVENTION

Figure 1:
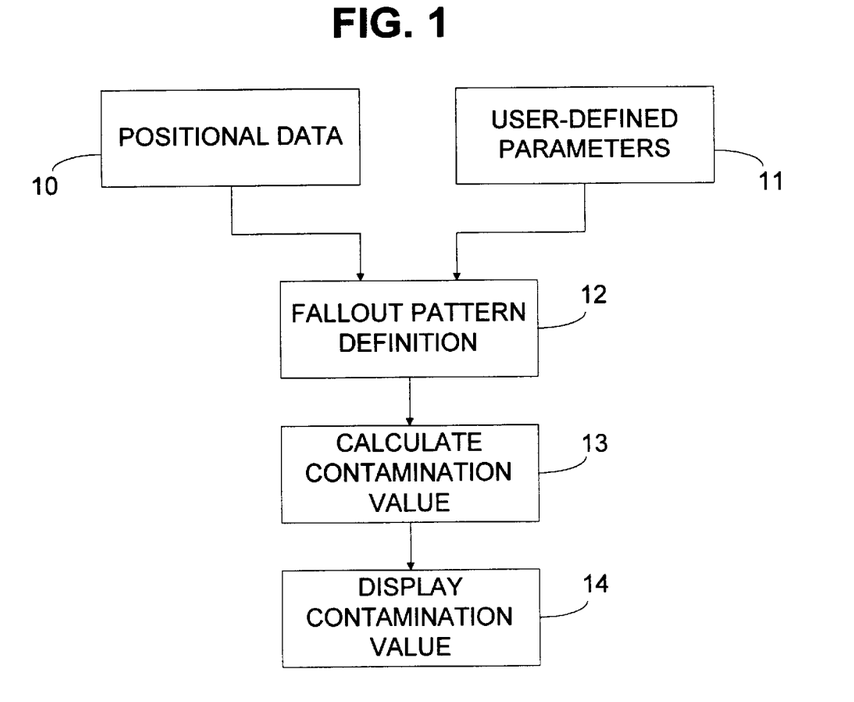
FIG. 1 is a block diagram showing the basic implementation of a preferred embodiment of the method according to the principles of the invention.

Illustratively, as shown in FIG. 1, a method according to the principles of the invention comprises the steps of deriving positional data 10 for a user's location, inputting user-defined data parameters 11 (e.g., wind characteristics, ground zero positional data, fallout pattern characteristics, and the like), defining a fallout pattern 12 based on the positional data and user-defined input, calculating a simulated contamination value 13 for the user's location, and displaying the contamination value 14. Because the method is represented in a computer program that comprises a fallout pattern generating algorithm for generating the data on a near real-time basis, cumbersome and inefficient lookup tables are unnecessary. In the preferred embodiment, the computer program was written in GWBASIC, but other suitable programming languages could also be used.

Figure 2:
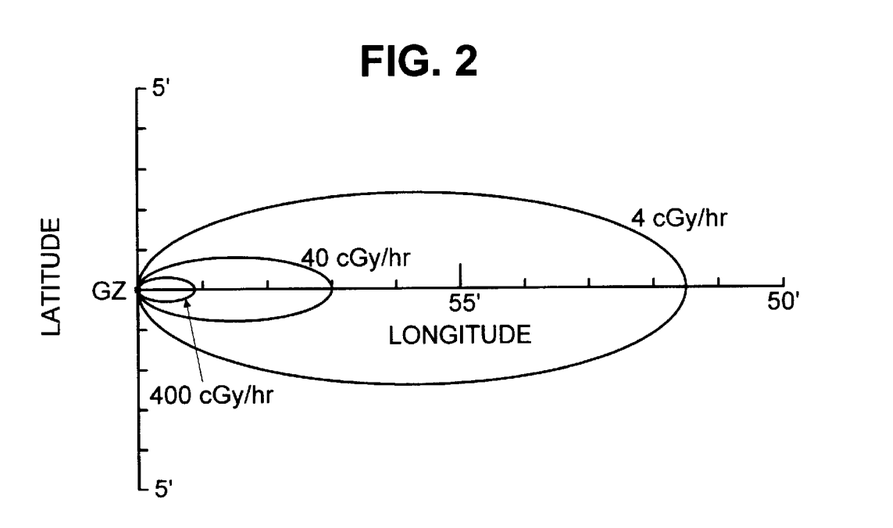
FIG. 2 is a graphical representation showing the general characteristics of a fallout pattern of NBC contamination.

As illustrated in FIG. 2, typical fallout patterns of NBC contamination are elliptical and can be defined by an algebraic equation. For nuclear contamination, fallout comprises radioactive dirt and debris that is formed when large quantities of ground material are drawn up into the fireball giving the appearance of the familiar mushroom-shaped cloud. This cloud is then wind-driven and the contaminated debris falls out along the path of travel. An idealized pattern would be elliptical with ground zero forming the point of highest contamination. The lines of equal contamination concentration (e.g., dose rate for nuclear contamination), called isopleths, are typically ellipses originating at ground zero with the major axis oriented with the wind direction.

To effectively simulate the detection of contamination at a user's location, the present invention correlates simulated contamination values (e.g., radiation dose rate) with the latitude and longitude data for the user's location by automatically generating a fallout pattern via an algorithm which defines an elliptical fallout pattern using the user-defined data parameters and positional data derived for the user's location. The elliptical fallout pattern is thus representative of nuclear, biological, and chemical fallout for the user's location.

Figure 3:
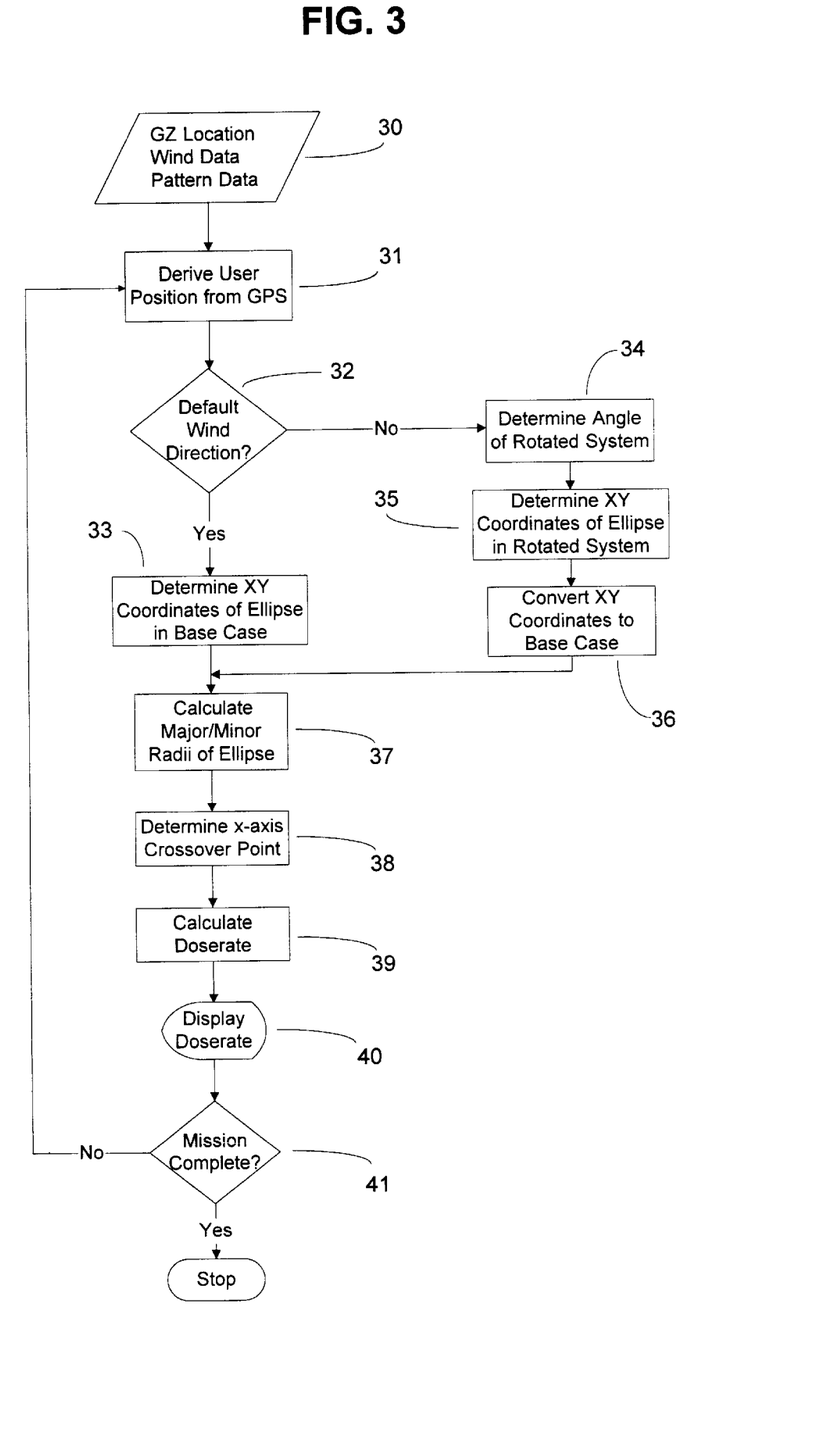
FIG. 3 is a flow chart diagram helpful in understanding the fallout pattern generating algorithm used in a preferred embodiment of the method.

As depicted in FIG. 2, the major axis for the simulation is selected as the line of latitude passing through the ground zero location (hereinafter referred to as GZ). This line of latitude becomes the x-axis for the simulation, GZ becomes the origin for the coordinate system, and the line of longitude passing through GZ becomes the y-axis. Referring to FIG. 3, the user provides input 30 which includes GZ location, wind data, and fallout pattern data for use in the simulation. Because prevailing winds in the United States normally originate from the west, the pattern for the simulation in the base case is chosen as originating at GZ with the wind oriented from west to east (i.e., default wind direction 32 in FIG. 3). The coordinates of the user's location 31 are automatically derived by a global positioning system (GPS) or other suitable position-deriving means. The GZ coordinates are then subtracted from the user's location coordinates to yield the XY coordinates 33 for the simulation.

Because a fallout pattern is relatively continuous, an ellipse representing the fallout pattern can be accurately defined algebraically. In the present invention, simulated contamination values are assigned to a family of ellipses which are algebraically derived. These ellipses represent the isopleths of a contamination concentration plot. This results in a simulation that adequately resembles a fallout pattern without having to rely on a cumbersome lookup table that can only provide a crude representation of the fallout pattern because of the required interpolation of data covering tens to hundreds of square miles. Therefore, in a preferred embodiment of the method, the simulation is accomplished by assigning a family of ellipses centered on the x-axis and extending from the origin (i.e., GZ) based on the user-defined inputs and the latitude and longitude coordinates of the user's location obtained from the GPS or equivalent system.

Figure 4:
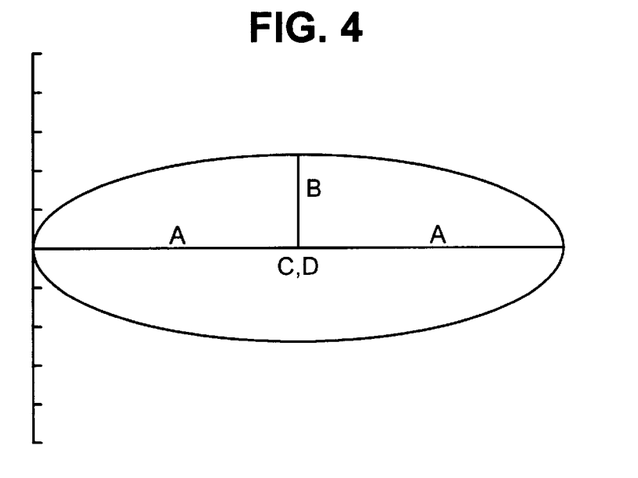
FIGS. 4 and 5 are graphical representations helpful in understanding a preferred embodiment of the method which uses ellipses defined by algebraic algorithms to simulate contamination fallout patterns.

Algebraically, the equation for an ellipse is defined as:

$$\frac{(X-C)^2}{A^2} + \frac{(Y-D)^2}{B^2} = 1 \qquad \text{(Equation 1)}$$

where X and Y are the XY coordinates (obtained by subtracting the GZ coordinates from the user's location coordinates determined by the GPS), C and D are the X and Y coordinates respectively for the center of the ellipse, and A and B are the major and minor radius respectively of the ellipse, as shown in FIG. 4. Because the ellipses are to lie on the x-axis with the western most points of the major radii to meet at the origin (i.e., GZ), values for the center of the ellipse are assigned as C=A and D=0. Thus, for the family of ellipses starting at the origin and lying on the x-axis, where C=A and D=0 in Equation 1:

$$\frac{(X-A)^2}{A^2} + \frac{Y^2}{B^2} = 1 \qquad \text{(Equation 2)}$$

and $$B^2 = \frac{A^2 Y^2}{2AX - X^2} \qquad \text{(Equation 3)}$$

In order to solve the equation, a ratio for A/B must be assumed. A ratio of 2:1 was used because fallout patterns are typically elongated in the direction of the wind, so that A=2B. However, the ratio of A to B (i.e., pattern data 30 in FIG. 3) is arbitrary and can be changed accordingly by the user to simulate the effects of different wind velocities on the resulting pattern. For example, a more powerful wind will produce a longer and narrower pattern such that the value for A will be larger while the value for B will be smaller. To calculate the major and minor radii 37 (FIG. 3) of the ellipse, the values for A, C and D are substituted in Equation 3 to solve for B, resulting in the following:

$$B = \frac{4Y^2 + X^2}{4X} \qquad \text{(Equation 4)}$$

Figure 5:
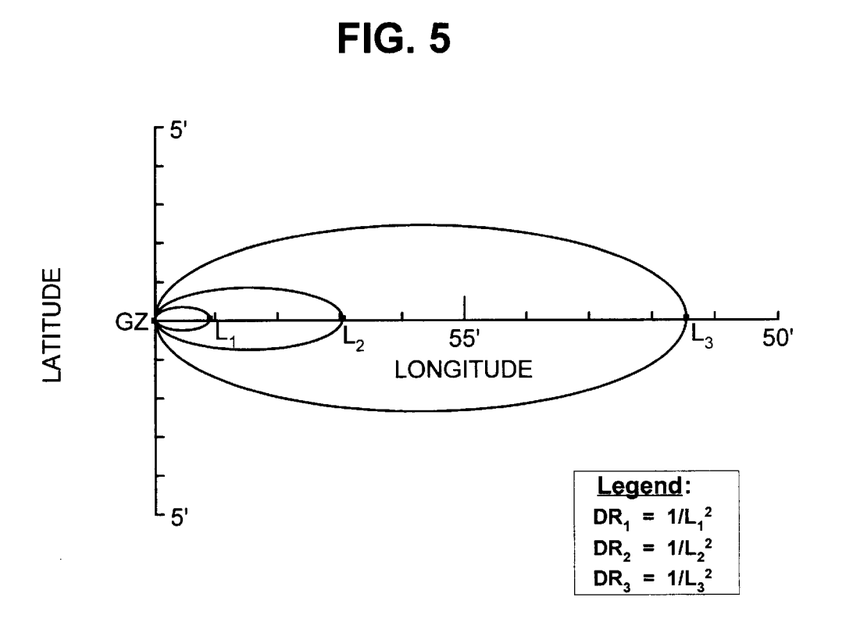

For any positional data obtained from the GPS for a user's location, therefore, a unique ellipse is obtained that lies on the x-axis, passes through the user's position and GZ, and has the characteristic A=2B. Because the ellipses represent lines of constant contamination, the simulated contamination concentration is the same on any point on a given ellipse. Simulated contamination values (e.g., dose rate for nuclear radiation) are calculated for the ellipses based on the x-axis crossover point L of each ellipse as shown in FIG. 5.

These crossover points, L, are determined 38 (FIG. 3) by the following equation:

$$L = 2A \qquad \text{(Equation 5)}$$

Because fallout patterns tend to be non-linear with contamination increasing as GZ is approached, a non-linear function is used for calculating the contamination values. In particular, $1/L^2$ is chosen as the starting point because this relationship provides a good representation of historically mapped patterns. To facilitate the calculation of contamination values which reflect realistic readings, the simulation for nuclear contamination was based on an existing radiac device, the Army-developed AN/VDR-2, which is a microprocessor-based digital ratemeter used for actual NBC detection having a range of readings from 0.1 $\mu$Gy/hr to 230 Gy/hr (Gy=Gray which is the unit of measure for absorbed nuclear radiation). The values for L are calculated in seconds of longitude and the displayed contamination values (e.g., dose rate) are desired to be at the maximum value of 230 Gy/hr at or very close to GZ. The initial value required to give these expected results is 1080000. Therefore, the equation for calculating dose rate 39 (FIG. 3) for the elliptical fallout pattern of nuclear contamination is as follows:

$$DR = \frac{1080000}{L^2} \; cGy/hr \qquad \text{(Equation 6)}$$

The contamination value (e.g., dose rate) is then displayed 40 (FIG. 3), and is indicative of a contamination level at the user's location. Some typical values for the simulated fallout patterns are shown in FIG. 2. If a training mission is to continue 41 (FIG. 3), and the user moves to a new location, the global positioning system (GPS) or other position-deriving means automatically derives the coordinates for the new location and the steps for determining the contamination value are repeated for the new location. Therefore, the method according to the principles of the invention is used to realistically simulate detection of contamination as a user moves through an exercise area.

This method can be used to effectively simulate prompt radiation, arriving fallout or chemical/biological plumes and hotspots by altering the A/B ratio, moving GZ with time, modifying Equation 6, or a combination thereof. Moreover, in the present invention, a multitude of different fallout scenarios having various pattern shapes and sizes can be selected by simply changing the parameters in the software.

For example, fallout patterns can be generated for wind directions having other than a direct west to east orientation by using a new XY coordinate system that is derived from a wind direction 30 (FIG. 3) input by the user. Based on the wind direction 30 (FIG. 3) entered by the user, the fallout pattern generating algorithm calculates an angle $\theta$ which represents the angle of a rotated system 34 (FIG. 3) and is measured between the new x-axis of the rotated system (e.g., wind-driven case) and the original x-axis for the base case, where the base case is the XY coordinate system for a direct west to east wind. To calculate contamination values for the ellipses derived in the new XY coordinate system (i.e., rotated system), the ellipses are rotated back to the base case by using the following formulae:

$$X_n = X \cos \theta - Y \sin \theta \qquad \text{(Equation 7)}$$

$$Y_n = Y \sin \theta + Y \cos \theta \qquad \text{(Equation 8)}$$

where $X_n$ and $Y_n$ are the new coordinates 35 (FIG. 3) in the rotated system and $\theta$ is the angle 34 (FIG. 3) between the x-axis in the base case and the new x-axis. Rotation back to the original coordinate system requires expressions for X and Y in terms of $X_n$ and $Y_n$. Therefore, equations 7 and 8 are then solved for X and Y in order to rotate the systenm back to the base case 36 (FIG. 3) as follows:

$$X = X_n \cos \theta + Y_n \sin \theta \qquad \text{(Equation 9)}$$

$$Y = Y_n \cos \theta - X_n \sin \theta \qquad \text{(Equation 10)}$$

Therefore, after the wind direction is input by the user and the angle $\theta$ is calculated by the algorithm, positional data obtained from the GPS for a user's location is converted to an XY coordinate and rotated into the base case (i.e., elliptical patterns with the major axis on the positive x-axis), and the previously defined formulae (i.e., Equations 1 through 6) are then applied to calculate the simulated contamination values.

In another preferred embodiment of the invention, the method further comprises steps for calculating a contamination value for a backlobe that extends in an opposite direction from the main elliptical pattern. In a realistic fallout pattern, the backlobe is represented by a small circular pattern around GZ caused by the initial explosion. The steps for simulating the backlobe are similar to those used for simulating the elliptical fallout pattern except that an equation for a circle is used in lieu of the equation for an ellipse. Once the x-axis crossover point is obtained by solving the appropriate equations for the circle, a contamination value (e.g., dose rate for nuclear radiation), which is indicative of a contamination level for the backlobe, is calculated by using the following formula:

$$DR = \frac{1080000}{L^5} \qquad \text{(Equation 11)}$$

A greater exponent in the denominator is used since the backlobe has much smaller dimensions than the main elliptical pattern.

In another preferred embodiment of the invention, the method comprises steps for calculating the contamination values for hotspots, which are highly concentrated areas of contamination caused by bomb debris and conditions such as rain water runoff. Steps similar to those used for simulating the backlobe are used except that the exponent in the denominator of equation 11 will be increased in order to yield an even smaller pattern than the backlobe, and the numerator will be decreased to reduce the overall intensity. The method for calculating the contamination value for a hotspot further comprises the step of inputting a ground zero (GZ) location that is unique for that particular hotspot location. Consequently, hotspots can be placed anywhere in the simulated area.

Another preferred embodiment of the invention accounts for the effects of time on the intensity of the fallout. In particular, a relatively new event can only be simulated if there is a rise and subsequent fall of the contamination at a given location for the preceding event. The rise and subsequent fall of the contamination is used to accurately depict the arrival and following decay of the fallout intensity. To accomplish the time-factored calculation, the numerator in equation 6 is increased from an initial value of 0 (e.g., prior to blast) to the maximum value of 1080000 in the first hour of the simulation. After the first hour, the contamination value (e.g., dose rate for nuclear) is calculated using the following formula:

$$DR = (T^{-1.2})\frac{(1080000)}{L^2} \quad \text{(Equation 12)}$$

where T is the time in hours after the maximum value is reached.

As is known in the art, a chemical or biological cloud is different from nuclear fallout in that there does not have to be residual contamination left on the ground. The cloud, therefore, moves generally in the direction and at the speed of the wind. Therefore, in another preferred embodiment of the invention, the method further comprises the steps of inputting data parameters for wind characteristics and a time of burst for the chemical or biological event, and providing clock timing to sequentially move the fallout pattern in relationship to the wind characteristics and according to the time of burst. Therefore, in operation, the chemical and biological scenarios are simulated by moving GZ in the direction and speed of the wind, where the speed and direction of the wind are user-defined inputs. Timing can be provided by the internal clock of the computer.

Figure 6:
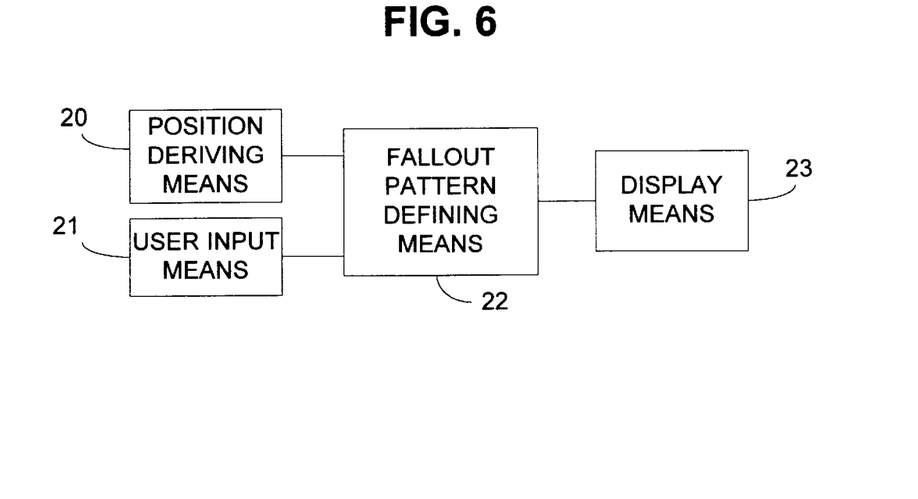
FIG. 6 is a block schematic diagram of a preferred embodiment of the apparatus according to the principles of the invention.

For a more detailed appreciation of a preferred embodiment of an apparatus for simulating NBC detection, your attention is invited to FIG. 6 which shows a block schematic diagram of the apparatus which comprises a position deriving means 20, a user input means 21, a means 22 for algebraically defining a fallout pattern, defining means 22 being responsive to data received from said position deriving means 20 and said user input means 21, and a display means 23 that communicates with said defining means 22. The position deriving means 20 can be a global positioning system (GPS) or any suitable means for automatically deriving positional data representing coordinates of a location into which the apparatus has been carried. The defining means 22 can be a computer having a computer program with a fallout pattern generating algorithm. Because of the advantages of using the apparatus in a mobile training environment, the computer 22 would ideally be a highly portable computer, such as a palmtop computer. The user input means 21 can be any suitable means for generating input signals and typically would be a general purpose computer programmed with a training scenario as defined by the user-defined data parameters for the simulation. These user-defined data parameters include coordinates for the ground zero (GZ) location, data on wind speed and direction, time of burst, and data defining the characteristics of the fallout pattern (e.g., size and shape of pattern as defined by the ratio of the major radii A to the minor radii B of the elliptical fallout pattern). These user-defined data parameters are represented by input signals which are transmitted by the user input means 21 to the defining means 22 by means of a serial interface, or other suitable communications interface.

Because of the small size of the display on a portable computer such as a palmtop computer, the simulated contamination values can be difficult to read while the system is in operation. To alleviate this problem, the computer 22 comprises a computer program having a graphical display algorithm which communicates with the display means 23. The numbers and letters required for displaying the contamination values are developed in a predetermined graphical character format using graphic commands which are then placed in a lookup table. Thus, as each new contamination value is calculated, the lookup table is referenced, the contamination value is correlated with a predetermined graphical character, and the appropriate graphics characters are displayed in the appropriate position on the display means in a more legible manner.

The following commercially available devices have been found suitable for use in the present invention: Garmin GPS-75 Global Positioning System and Hewlett Packard HP 100LX palmtop computer. However, many other equipment choices with comparable capabilities can be used to implement the invention.

In another preferred embodiment of the apparatus, the position deriving means 20, the computer 22 having a computer program with a fallout pattern generating algorithm, and the display means 23 are disposed within a single hardware package which constitutes a simulated radiac instrument. With this configuration, the invention will most closely approximate the appearance and operation of an actual detection instrument, such as a radiac.

Figure 7:
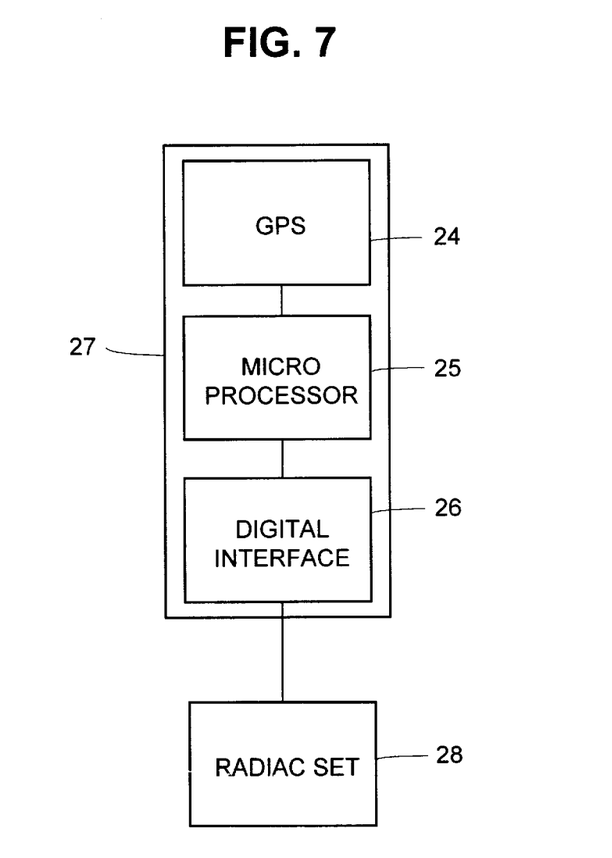
FIG. 7 is a block schematic diagram of a second preferred embodiment of the apparatus, helpful to understanding the integration of the apparatus with an actual NBC detection device.

FIG. 7 illustrates another preferred embodiment of the apparatus comprising a global positioning system 24, a microprocessor 25 containing the computer program with the fallout pattern generating algorithm, said algorithm being responsive to data received from said global positioning system 24, and a digital interface 26 which communicates with said microprocessor 25. The global positioning system 24, microprocessor 25, and digital interface 26 are disposed within a detachable probe 27 that communicates with an actual radiac set 28 through digital interface 26. This embodiment will therefore provide the most realistic approximation of the appearance and operation of an actual detection instrument, such as a radiac, which comprises a detachable probe for detection readings.

In operation, a typical training scenario would proceed as follows (see FIG. 6). The user enters coordinates for the ground zero location (i.e., site of blast), wind speed and direction, and the desired ratio for defining the shape of the fallout pattern (i.e., ratio of the major radii A to minor radii B for the ellipse) using the user input means 21. As the user carries the apparatus into a training location, the position deriving means 20 is activated to automatically determine the coordinates of the user's current location. The defining means 22 comprises an algorithm which algebraically defines an elliptical fallout pattern and a corresponding contamination value based on the user's input and the positional data. The contamination value is then displayed by display means 23 with the contamination value being indicative of a contamination level for the user's location into which the apparatus has been carried. As the user moves to a new location, the position deriving means 20 automatically determines the new coordinates of the user's location and the steps for determining the contamination value are repeated for the new location. Therefore, the device and method according to the principles of the invention are used to realistically simulate detection of contamination as a user moves through an exercise area.

Although the present invention has been described in relation to several different embodiments, I wish it to be understood that I do not desire to be limited to the exact details of construction shown and described, since obvious modifications will become apparent to a person skilled in the art. Therefore, the present invention should not be construed to be limited by the specific disclosure, but only by the appended claims.

What is claimed is:

1. A method for deriving simulated fallout levels of nuclear, biological, and chemical (NBC) contamination in a training environment, comprising the steps of:

deriving coordinates automatically to define the location of a trainee;

obtaining data from the trainee which includes both the training environment and a NBC discharge;

programming a computer with the trainee's data and location coordinates to algebraically define individual elliptical patterns, each of which represents an isopleth for a particular contamination fallout level;

programming the computer to assign a symbolic representation for the fallout level of each isopleth; and displaying the elliptical pattern applicable to the trainee's location and the symbolic representation for the fallout level thereof.

2. The method of claim 1 wherein the trainee's data relative to the elliptical patterns further includes wind characteristics and the position of ground zero.

3. The method of claim 1 wherein the coordinates for the location of the trainee are derived with a global positioning system.

4. The method of claim 1 wherein the trainee's data further includes the location of a NBC hotspot and further comprising the steps of:

programming the computer to algebraically define a circular pattern for representing contamination fallout of a particular level at the hotspot;

programming the computer to assign a symbolic representation for the fallout level of the circular pattern; and displaying the circular pattern and the symbolic representation for the fallout level thereof.

5. The method of claim 1 wherein the programming step which defines the elliptical patterns utilizes elapsed time to relate time-factored fallout levels thereto.

6. The method of claim 2 and further comprising the steps of:

programming the computer to algebraically define a circular pattern relative to the position of ground zero for representing contamination fallout of a particular level at a NBC backlobe;

programming the computer to assign a symbolic representation for the fallout level of the NBC backlobe; and displaying the circular pattern and the symbolic representation for the fallout level thereof.

7. The method of claim 2 wherein a clock timing step is further included and the trainee's data relative to the elliptical patterns further includes a time of burst relative to a chemical/biological cloud, with those patterns being sequentially configured in accordance with the wind characteristics and time of burst.

8. An apparatus for deriving simulated fallout levels of nuclear, biological, and chemical (NBC) contamination in a training environment, comprising:

means for deriving coordinates automatically to define the location of a trainee;

means for obtaining data from the trainee which includes both the training environment and a NBC discharge;

means for programming a computer with the trainee's data and location coordinates to algebraically define individual elliptical patterns, each of which represents an isopleth for a particular contamination fallout level;

means for programming the computer to assign a symbolic representation for the fallout level of each isopleth; and means for displaying the elliptical pattern applicable to the trainee's location and the symbolic representation for the fallout level thereof.

9. The apparatus of claim 8 wherein the trainee's data relative to the elliptical patterns further includes wind characteristics and the position of ground zero.

10. The apparatus of claim 8 wherein the coordinates for the location of the trainee are derived with a global positioning system.

11. The apparatus of claim 8 wherein the trainee's data further includes the location of a NBC hotspot and further comprising:

means for programming the computer to algebraically define a circular pattern for representing contamination fallout of a particular level at the hotspot;

means for programming the computer to assign a symbolic representation for the fallout level of the circular pattern; and means for displaying the circular pattern and the symbolic representation for the fallout level thereof.

12. The apparatus of claim 8 wherein the programming means which defines the elliptical patterns utilizes elapsed time to relate time-factored fallout levels thereto.

13. The apparatus of claim 9 and further comprising:

means for programming the computer to algebraically derive a circular pattern relative to the position of ground zero for representing contamination fallout of a particular level at a NBC backlobe;

means for programming the computer to assign a symbolic representation for the fallout level of the NBC backlobe; and means for displaying the circular pattern and the symbolic representation for the fallout level thereof.

14. The apparatus of claim 9 wherein clock timing is further included and the trainee's data relative to the elliptical patterns further includes a time of burst relative to a chemical/biological cloud, with those patterns being sequentially configured in accordance with the wind characteristics and time of burst.

* * * * *